(12) United States Patent
Huentelman et al.

(10) Patent No.: US 7,653,622 B2
(45) Date of Patent: Jan. 26, 2010

(54) AUTOMATED CONTENT CATEGORIZATION

(75) Inventors: Mark D. Huentelman, Bellevue, WA (US); Stephen N. Anderson, Redmond, WA (US); Eugene Lee, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 11/192,786

(22) Filed: Jul. 29, 2005

(65) Prior Publication Data
US 2007/0027861 A1    Feb. 1, 2007

(51) Int. Cl.
*G06F 7/00* (2006.01)
*G06F 17/30* (2006.01)

(52) U.S. Cl. .......................... 707/5; 707/102

(58) Field of Classification Search ............... 707/1–10, 707/100–104.1, 200–206
See application file for complete search history.

(56) References Cited

U.S. PATENT DOCUMENTS 6,704,729 B1 * 3/2004 Klein et al. .................... 707/5
2002/0052894 A1 * 5/2002 Bourdoncle et al. ........ 707/513
2003/0163485 A1 * 8/2003 Goodwin et al. ......... 707/104.1

OTHER PUBLICATIONS

Glover et al., Improving category specific Web search by learning query modifications, Jan. 8-12, 2001, IEEE, 23-31.*
Narayan et al., Topic continuity for Web document categorization and ranking, Oct. 13-17, 2003, IEEE, 1-6.*
U.S. Appl. No. 10/780,505, filed Feb. 17, 2004, Robert N. Ashby, Mark D. Huentelman, Kevin R. McDowell, Christine E. Vadai.
U.S. Appl. No. 10/903,533, filed Jul. 30, 2004, Stephen N. Anderson, Benjamin E. Canning, Sabrina M. Kikkert.

* cited by examiner

*Primary Examiner*—Jean B Fleurantin (57) ABSTRACT

When a user submits a content resource to a content database, an automated content categorizer facilitates the task by suggesting a list of relevant content categories in the content database. The automated content categorizer receives a search descriptor attributed to the content resource, performs a relevance search, and proposes a ranked list of category branches that are expected to provide a good match with the described content resource. Metadata associated with individual categories and content resources stored in the content database are searched relative to the search descriptor provided by the user. From the proposed content categories, the user can simply select the category he or she feels is most appropriate and store the content resource under that category in the content database, or propose a new category.

20 Claims, 9 Drawing Sheets

AUTOMATED CONTENT CATEGORIZATION

TECHNICAL FIELD

The invention relates generally to content databases, and more particularly to automated content categorization.

BACKGROUND

Online content databases can provide large numbers of users with access to a variety of content resources, such as articles, images, templates, video and audio files, news articles, driver updates, etc. In many online database applications, the database is characterized by a hierarchy of categories (i.e., taxonomy) that can lead a user to a content resource of interest. In one example, a user can access a website and browse a hierarchy of categories and content resources developed by the website owner. By selecting categories of interest, the user can traverse relevant branches of the hierarchy to find the content resource he or she is looking for. However, although category hierarchies facilitate a user's search for a relevant content resource, associating each content resource within the proper categories and subcategories is a difficult task, even for the website owners who maintain the hierarchies.

This problem is amplified if the capability of submitting content resources into such content category hierarchies were made available to the users themselves. For example, the website may allow users to submit templates of electronic documents, such as business cards, resumes, business forms, etc., into the online database Unfortunately, such users are not as familiar with the existing hierarchy, are not trained in content resource categorization, and do not have the same quality control concerns as the website owners. Therefore, it difficult for an unfamiliar and untrained user to select an appropriate branch of categories in which to place the content resource.

SUMMARY

Implementations described and claimed herein address the foregoing problems by receiving a search descriptor of the content resource from the user and proposing a list of category branches that are expected to provide a good match with the described content resources. Metadata associated with individual categories and content resources stored in the content database are searched relative to the search descriptor provided by the user. The search results are ordered according to their relevance, and the most relevant categories are presented to the user. From these presented categories, the user can simply select the category he or she feels is most appropriate, override the presented categories and choose a different category manually, or propose a new category.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

DETAILED DESCRIPTIONS

When a user wishes to submit a content resource, such as a document, a template, an image, a multimedia file, a program file, etc., to a content database, an automated content categorizer facilitates the task by suggesting a list of relevant content categories in the content database. The user can enter a search descriptor of the content resource, such as a document file name, resource title, etc., and receive in return a list of potentially relevant content categories. From these, the user can select the category into which the content resource is stored in the database.

In addition, if an acceptable content category is not returned by the automated content categorizer, the user may browse the taxonomy of the content categories in the database and select a category he or she feels is more appropriate. Alternatively, the user may propose a new category label in association with the content resource, and the automated content categorizer can return a branch in the taxonomy under which the new category and content resource may be stored.

Figure 1:
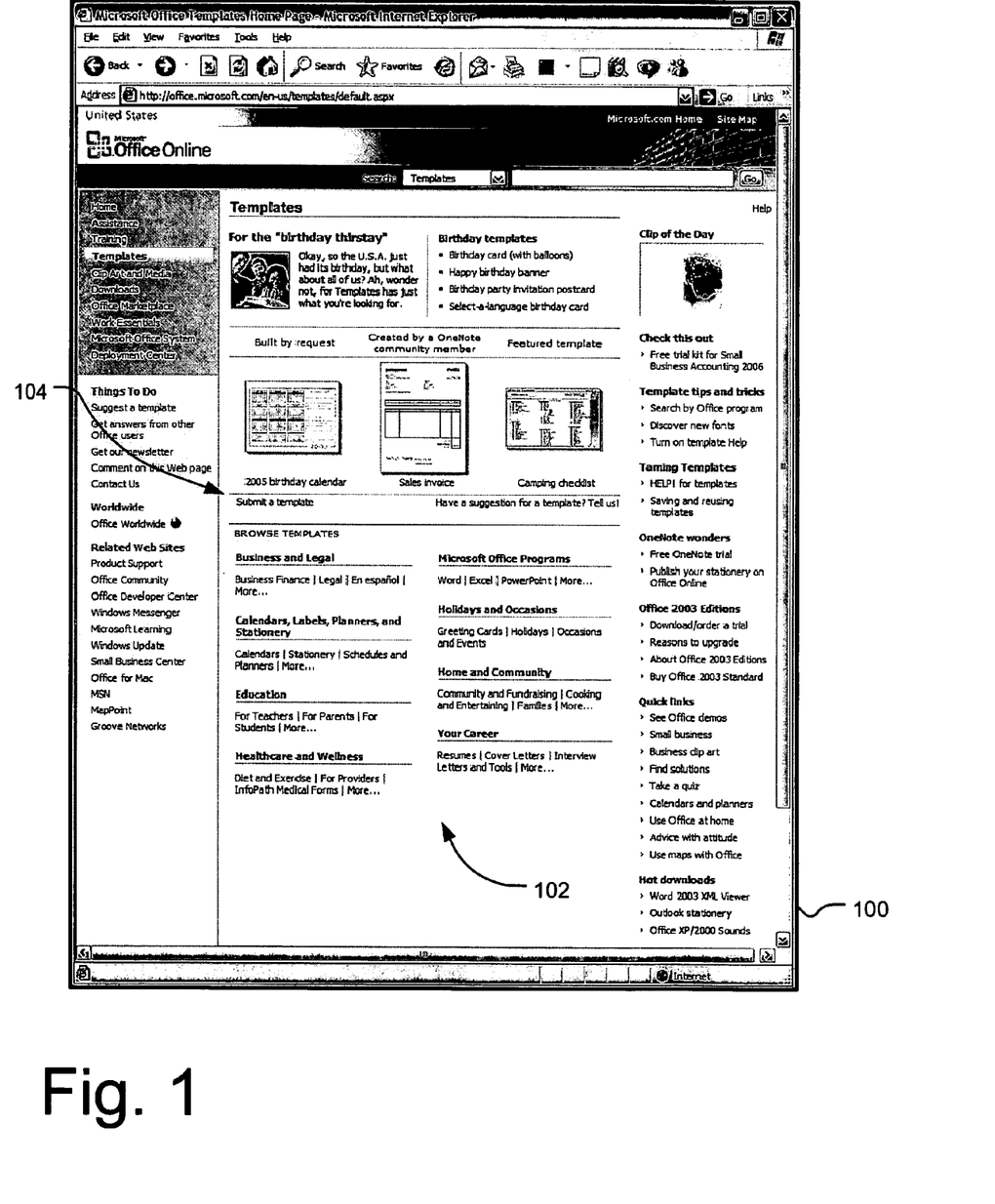
FIG. 1 illustrates an exemplary screenshot showing levels of the content category taxonomy in an online content database.

FIG. 1 illustrates an exemplary screenshot 100 showing levels of the content category taxonomy 102 in an online content database. The screenshot 100 shows a web page that is based on the online content database and allows users to browse the content categories of the online content database, access Office document templates, and submit their own templates into the online content database. A ROOT level (not shown) of the content category taxonomy 102 includes a second level of exemplary content categories, such as "Business and Legal", "Calendar, Labels, Planners, and Stationery", "Education", etc. Under each second level category, a third level of content categories is shown, including without limitation "Business Finance", "Legal", "Calendars", "Stationery", "Greeting Cards", "Families", etc. A category branch may take the form of:

Business and Legal\Business Finance\Business Financial Planning

A user may select the "Submit a Template" control 104 to submit a content resource (e.g., a template of an Office document) into the online content database supporting the web page. Responsive to the selection of the control 104, another web page is displayed to allow the user to select a content category in the online content database that is appropriate for the content resource he or she wishes to submit. To facilitate this process, particularly for users who are unfamiliar with the content category taxonomy and/or are not trained in content categorization, the other web page provides access to an automated content categorizer (see FIGS. 5 and 6, for example).

Figure 2:
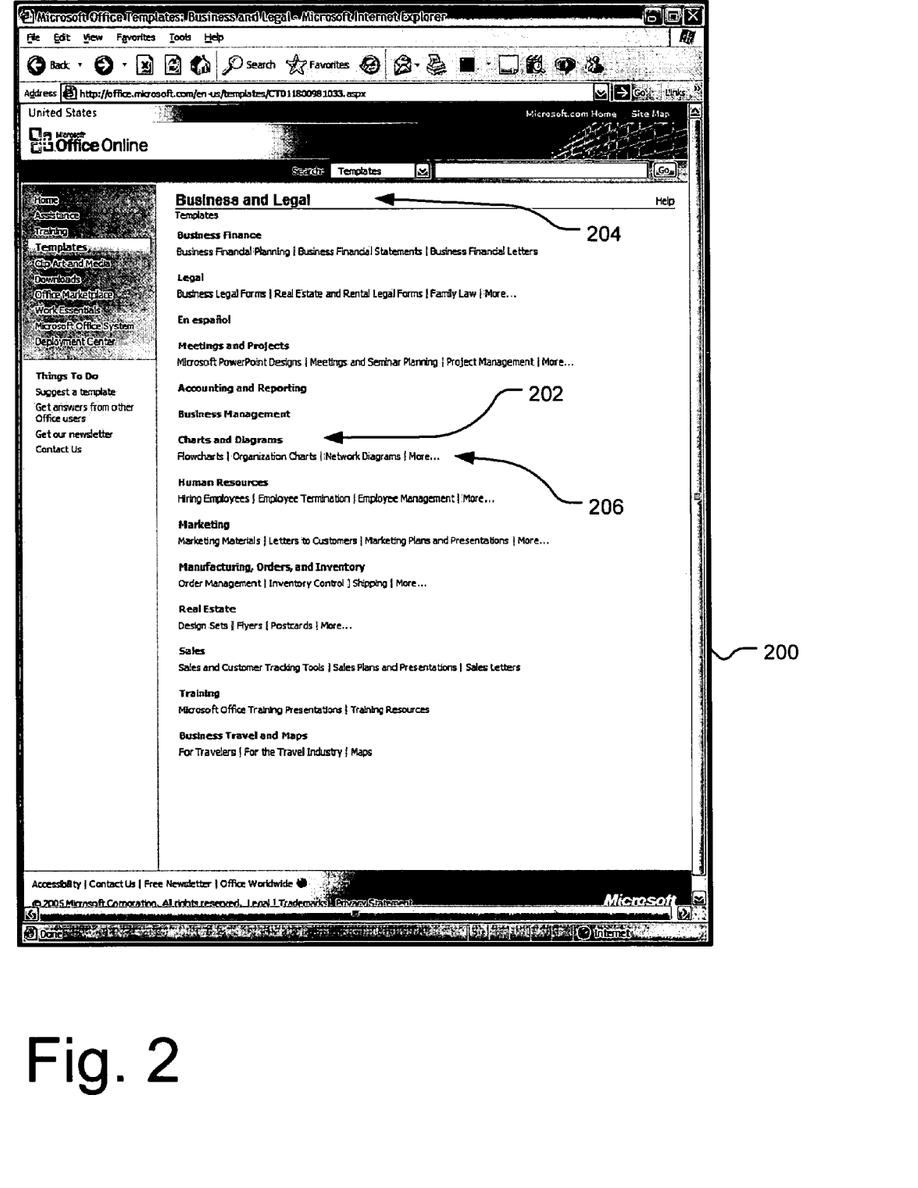
FIG. 2 illustrates an exemplary screenshot showing subcategories within the "Business and Legal" category in an online content database.

FIG. 2 illustrates an exemplary screenshot 200 showing subcategories (e.g., subcategories 202) within the "Business and Legal" category 204 in an online content database. The exemplary screenshot 200 also shows subcategories of the various subcategories 202 (e.g., subcategories 206). The taxonomy of an online content database can extend for many levels and have any number of entries at each level. Furthermore, it should also be understood that the content database may also reside in a stand-alone workstation without requiring any network access, although it is more typical that the automated content categorization would be employed in a networked environment. The automated content categorization supported by the application serving the web page of FIG. 2 facilitates a user's selection of an appropriate category under which to store a content resource within the online content database.

Figure 3:
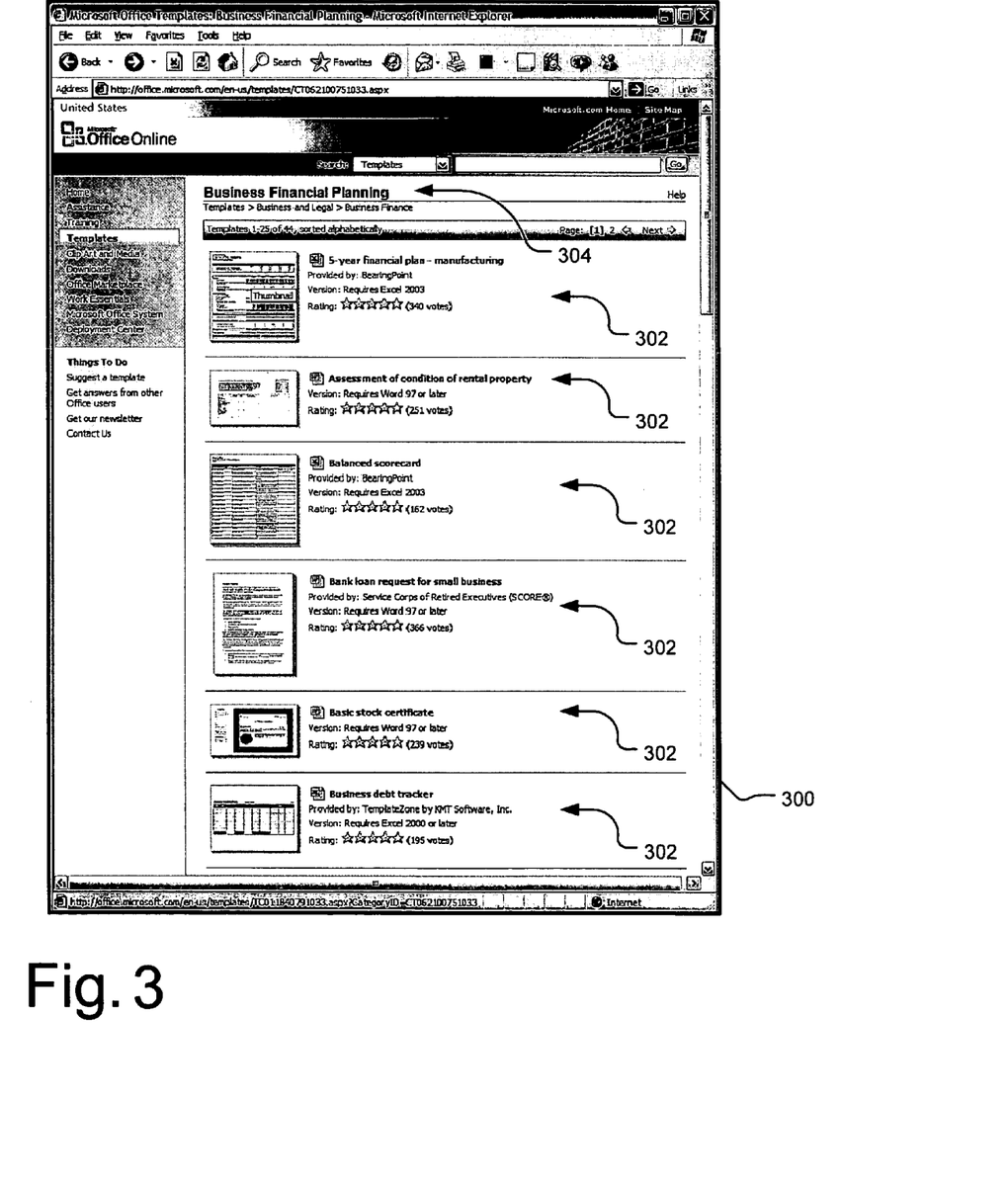
FIG. 3 illustrates an exemplary screenshot showing content resources within a content category of an online content database.

FIG. 3 illustrates an exemplary screenshot 300 showing content resources 302 within a content category 304 (i.e., "Business Financial Planning") of an online content database. Exemplary content resources may include without limitation a spreadsheet document and a word processing document, such as those shown in FIG. 3, as well as image files, audio files, video files, program files, etc.

Figure 4:
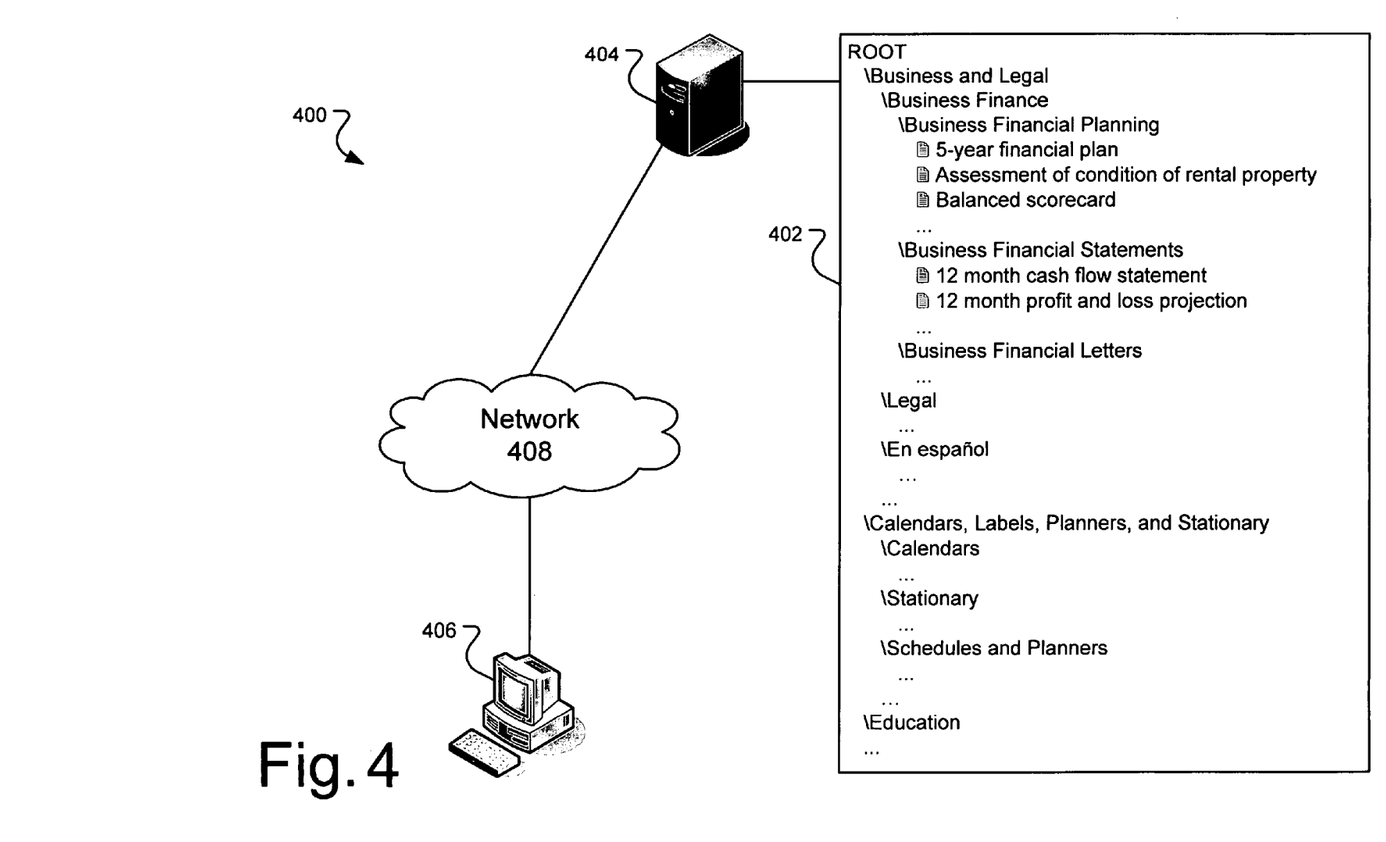
FIG. 4 illustrates an exemplary configuration and taxonomy of an online content database.

FIG. 4 illustrates an exemplary configuration 400 and taxonomy 402 of an online content database. A user can access a server 404 (e.g., a database server or a web server) via a client workstation 406 that is connected to the server 404 by a network 408 (e.g., the Internet). The user browses to a web page servicing the online content database (such as shown in FIG. 1) and gains access to the content categories supported by the online content database, which are listed in part in the illustrated taxonomy 402. In the web page, the user can select a "Submit a Template" control to categorize and store a template (i.e., a type of content resource) into the online content database.

The taxonomy 402 shows exemplary content categories, such as "ROOT", "Business and Legal", "Business Finance", and "Business Financial Planning". With the Business Financial Planning" content category, individual templates "5-year financial plan", "Assessment of condition of rental property", and "Balanced scorecard" are listed.

The server 404 executes an application that can automate the categorization of a template the user wishes to submit to the online content database. Rather than requiring the user to traverse the entire taxonomy and select a content category the user believes might be appropriate for the template, the automated content categorizer inputs a search descriptor of the template and proposes content categories that are likely to be appropriate to the template.

Figure 5:
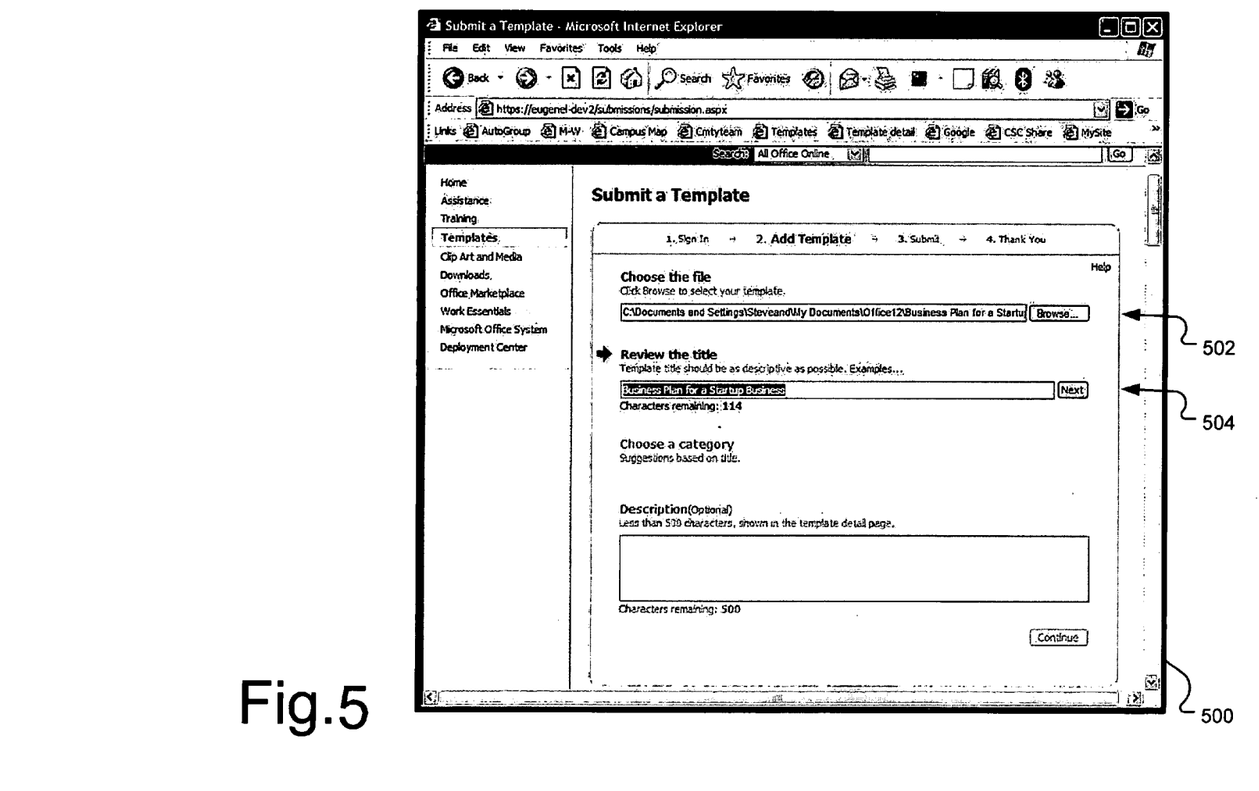
FIG. 5 illustrates an exemplary screenshot of a content resource submission page.

FIG. 5 illustrates an exemplary screenshot 500 of a content resource submission page. A resource field 502 receives a pathname to the content resource a user wishes to submit to the online content database. A title field 504 receives a search descriptor associated with the content resource, which can be used to select appropriate category options for the user's consideration. Such a search descriptor may include without limitation a title of the content resource, a description of the content resource, a listing of characteristics of the content resource (e.g., video format, electronic document format, etc.), and other terms intended to distinguish the content resource from other resources while providing enough description to provide acceptable categorization.

Figure 6:
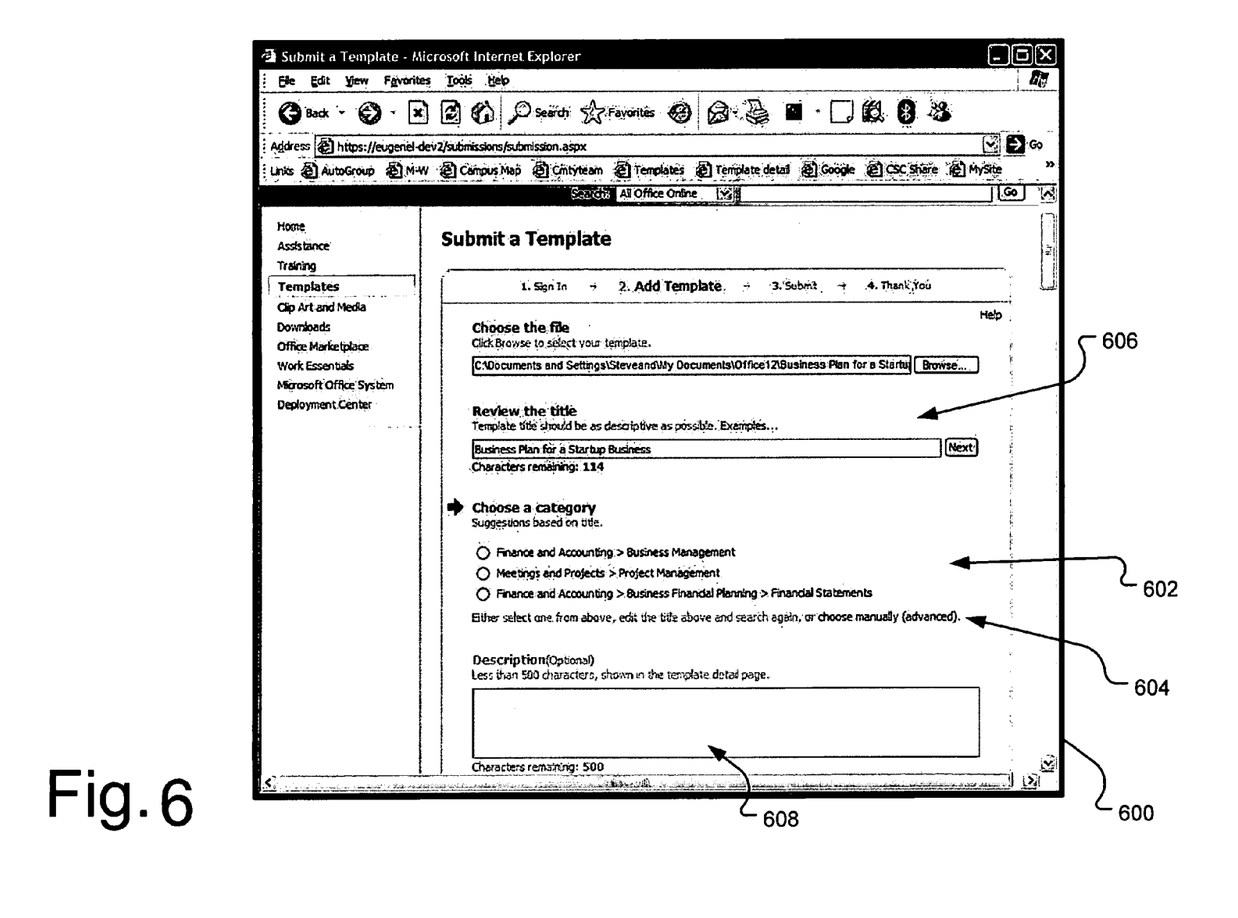
FIG. 6 illustrates an exemplary screenshot presenting content category suggestions.

FIG. 6 illustrates an exemplary screenshot 600 presenting content category suggestions 602. Based on the automated content categorization feature provided by the application serving the web page in screenshot 600, three content categories have been proposed for the title "Business Plan for a Startup Business":

Finance and Accounting>Business Management

Meetings and Projects>Project Management

Finance and Accounting>Business Financial Planning>Financial Statements

The user may select one of these content categories, choose another content category manually (by selecting the "choose manually" control 604), or alter the search descriptor 606 and re-execute the automated categorization to obtain alternative content categories suggestions. The Description field 608 can be used to populate or supplement the metadata associated with the submitted content resource.

Figure 7:
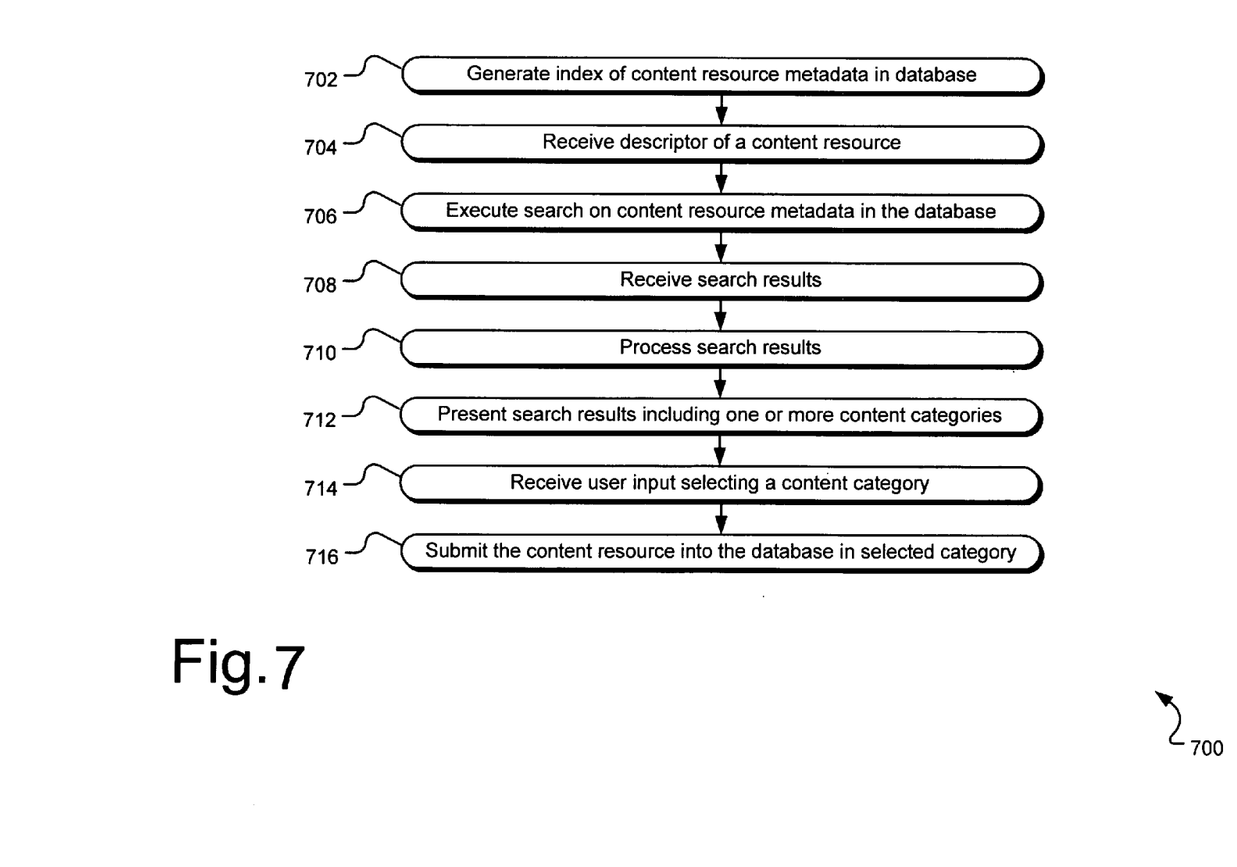
FIG. 7 illustrates exemplary operations for categorizing a content resource for a content database.

FIG. 7 illustrates exemplary operations 700 for categorizing a content resource for a content database. In one implementation, an indexing operation 702 generates an index from metadata associated with individual content resources in the content database. In one implementation, individual metadata are associated with a content resource in a search catalog recorded in the file system of the server or an associated persistent storage location. An index results from preprocessing data to be searched, particularly text, in order to improve search speed. After building an index (e.g., a suffix tree or suffix array), a search algorithm can find pattern matches very quickly, such as by using a binary search of the index. It should be understood, however, that non-index-based searching techniques can also be employed in the described categorization processes. Furthermore, it should be understood that the indexing may not be limited to the metadata associated with a single content resource but may also include metadata from content categories within the category branch containing the content resource as well as metadata associated with other content resources within the category branch.

Exemplary metadata for a content resource is shown in Table 1. Any field in the metadata file can be included in the index, although the text of the QUESTIONS field, the INFLECTIONS field, and/or a BEST BET field (not shown) can provide acceptable automated categorization results. The metadata file is typically maintained by the web page owner, although in alternative implementations, submitting users may provide some of the text and parameters to be included in the metadata file.

TABLE 1

Example Metadata File

```
<html>
  <head>
    <META http-equiv="Content-Type" content="text/html; charset=utf-8">
    <META NAME="assetdescription" CONTENT="">
    <META NAME="assetsize" CONTENT="18">
    <META NAME="CreationDate" CONTENT="08/15/2003">
  <TITLE>Petty cash log</TITLE>
<META NAME="MS.LOCALE" content="en"/>
<META NAME="ASSETID" content="TC010197951033"/>
<META NAME="PROVIDER" content="EY062201301033;Microsoft Corporation"/>
<META NAME="ASSETTYPE" content="TC"/>
<META NAME="LASTMODIFIEDDATE" content="2005-03-25 00:00:00"/>
<META NAME="SUBSCRPTLVL" content="1"/>
<META NAME="WLCID" content="1033"/>
<META NAME="PRODUCTVERSION" content="8"/>
<META NAME="ASSETSTART" content="1900-01-01 00:00:00"/>
<META NAME="PRIORITY" content="0"/>
<META NAME="SORTORDER" content="2"/>
<META NAME="HIDELEVEL" content="0"/>
<META NAME="QUESTIONS" content="cash advance,cash,,log,petty,expense
report,expense,ledger,expense sheet,Petty Cash Log,a petty cash ledger,AUDIT FOR
PETTY CASH,create a petty cash book,create a petty cash form,create a petty cash
report,create petty cash,creating petty cash system,HOW DO I MAKE A PETTY CASH
LOG,how do I set up an expense sheet for petty cash,how to create petty cash form,make
a petty cash form,Petty Cash,Petty Cash Account,petty cash authorization,Petty Cash
Balance Sheet,Petty Cash expenses,Petty Cash for Business,petty cash for office
form,petty cash form,petty cash formats,petty cash formatting please,petty cash
forms,Petty Cash Record,petty cash record?,petty cash report,petty cash sheet,Petty Cash
Statement,petty cash template,petty cash worksheet,Weekly Expense
Report,authorization"/>
<META NAME="APPLICATION" content="xl"/>
<META NAME="CATEGORY" content="CT062100761033"/>
<META NAME="ALTERNATECATEGORY" content="CT011377091033"/>
<META NAME="INFLECTIONS"
content="logarithm,logarithm,expenditure,expen,expence,expences,expenditure,expen,expence,
expences,expenditure,expen,expence,expences,shhet,logarithm,ceate,creat,creation,generate,
make,produce,recreate,bok,ceate,creat,creation,generate,make,produce,recreate,ceate,
creat,creation,generate,make,produce,recreate,ceate,creat,creation,generate,make,produce,
recreate,creatin,create,creation,imake,logarithm,setting__up,setup,expenditure,expen,expence,
expences,shhet,ceate,creat,creation,generate,make,produce,recreate,create,creation,imake,
accout,authorize,permission,shhet,bisiness,buiness,buisiness,buissnes,buissness,businees,
busness,busniess,bussines,company,corporate,corporation,offfice,offic,offie,ofice,ofiice,
formating,reformat,froms,shhet,tamplate,tamplates,temlate,tempate,tempates,tempelates,
templaes,templat,templeates,templte,templtes,tenplates,teplates,tmplates,tpl,templets,wooksheet,
work__sheet,worsheet,expenditure,expen,expence,expences,authorize,permission,excel,
CT062100761033,CT011377091033"/>
<META NAME="AVERAGERATING" content="430"/>
<META NAME="DOWNLOADS" content="42169"/>
<META NAME="VOTECOUNT" content="521"/>
</head>
  <body>
  </body>
</html>
```

The QUESTIONS field represents terms and phrases associated with the content resource. For example, such terms and phrases may be taken from questions that are anticipated to be input by users in order to locate the associated content resource. The INFLECTIONS field represents variations of related terms, including misspellings, rough synonyms and homonyms, alternative tenses, etc. The BEST BET field, although not shown in Table 1, represents a priority term or set of terms, such that if a match between the search term (or terms) with the BEST BET field terms of a given content resource is detected, the content resource is ranked higher in the search results than those without a BEST BET match.

Other fields in the metadata file identify the content resource, which is associated with the metadata file, and associate the content resource with individual content categories. For example, the content resource associated with the metadata file of Table 1 is specified by the ASSETID tag as "TC010197951033" (a content resource identifier). The content resource is associated with (e.g., included in) the category specified by the CATEGORY tag as "CT062100761033" (a content category identifier). The same content resource is also associated with another category specified by the ALTERNATECATEGORY tag as "CT011377091033" (another content category identifier). In one implementation, the various identifiers represent keys into an index or table containing category pathnames, although alternative identifiers can be use, including the complete category pathnames.

In a receiving operation 704, a descriptor associated with the content resource is received by an automated content categorizer. For example, a resource title may be received as a search descriptor via a web page form field, although other descriptors are contemplated.

A search operation 706 executes a search of the metadata associated with the content resources stored in the content database. For example, to identify relevant categories for a submitted resource, the search operation 706 may search the metadata in existing resources already stored in the content database by the database owners. In this manner, the suggestions will reflect some influence of the owners' predefined categorization preferences. Alternatively, all content resources in the content database, including those submitted by third-parties, may be included in the search.

In one implementation, a relevance search engine operates on the generated index of the content resource metadata, although in an alternative implementation, no index exists and the search is performed on the metadata itself. The indexing or search may also operate on metadata associated with other content categories in the category branch and/or other content resources in the category branch. If the search engine determines that metadata for a given content resource satisfies the search criteria associated with a descriptor, the search operation 706 returns the content category identifier and the content resource identifier specified in the associated metadata file. In a relevance search, the search results are returned in order of relevance (a ranking designation), such that the identifiers for the most relevant content categories are returned first and the identifiers for the less relevant content categories are returned last. In an alternative relevance search, the search results are given a ranking number (a ranking designation) to indicate their perceived relevance to the search descriptor.

A receiving operation 708 receives the search results from the search operation 706. Exemplary search results may include the content resource identifier and an associated content category identifier for each content resource satisfying the search criteria, based on the search descriptor.

A processing operation 710 collects the search results and orders the content categories according to a ranking algorithm. In one implementation, a ranking engine ranks the content resources according to the raw relevance returned by the searching operation 706. The associated content categories are then ranked using the rankings of content categories they contain. In an alternative implementation, the content categories are ranked according to the highest relevance score obtained by a content resource in the content category. In yet another implementation, the ranking number of each category is weighted according to the number of times a content resource within the content category satisfied the search criteria. In yet another implementation, the ranking numbers associated with a content category are summed and the resulting ranking sum is attributed to the content category. Other ranking algorithms are also contemplated. The processing operation 710 uses the ranking algorithm to rank the content categories in order of relevance or weighted relevance, and in one implementation, returns the top (i.e., most relevant) content categories (e.g., the top three content categories).

A presentation operation 712 presents the resulting content categories to the user for consideration. If the user finds a presented content category to be acceptable, a user input operation 714 receives a selection of the category through a user interface and a submission operation 716 stores the content resource via a database engine to the content database in association with the selected content category. The submission operation 716 also initializes the metadata associated with the newly submitted content resource, including assigning the ASSETID, CATEGORY, and ALTERNATECATEGORY values in the metadata file.

In one implementation, the user may be offered an opportunity to provide metadata terms to characterize the submitted content resource (see Description form field 608 of FIG. 6). In an alternative implementation, the owner of the content database generates at least a portion of the metadata associated with the submitted content resource in order to enhance the search accuracy. Indexing on the newly supplemented metadata in the database may be performed after each submission, on a periodic schedule, or when manually initiated.

Figure 8:
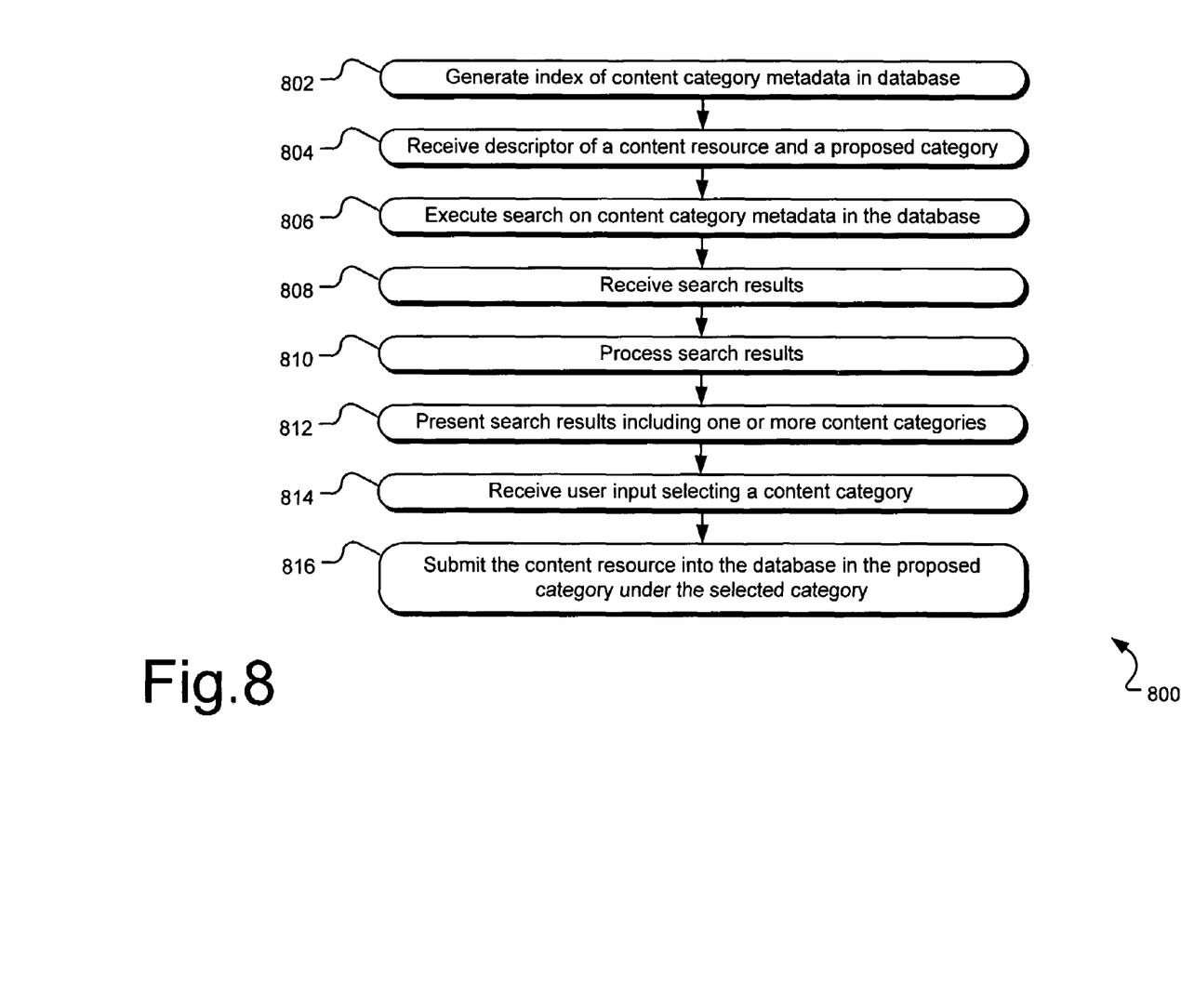
FIG. 8 illustrates exemplary operations for categorizing a content category for a content resource in a content database.

FIG. 8 illustrates exemplary operations for categorizing a content category for a content resource in a content database. Automated categorization of a proposed content category allows a user to propose a more desirable content category in case an acceptable content category is not available in the content database taxonomy. In this implementation, one or more higher level categories that appear relevant to the proposed category are presented. If the user selects one of these presented categories, the proposed category is inserted into the taxonomy of the content database under the selected category, and the content resource associated by the user with the proposed category is stored under that category in the content database.

In one implementation, an indexing operation 802 generates an index from metadata associated with individual content categories in the content database. In one implementation, individual metadata data are associated with a content resource in a search catalog recorded in the file system of the server or an associated persistent storage location. It should be understood, however, that non-index-based searching techniques can also be employed in the described categorization processes. Furthermore, it should be understood that the indexing may not be limited to the metadata associated with a single content category but may also include metadata from other categories within the same category branch as well as metadata associated with content resources within the category branch.

In a receiving operation 804, a search descriptor associated with the content resource and a proposed content category is received by an automated content categorizer. For example, a resource title and a proposed category title may be received as a search descriptor via a web page form field, although other descriptors are contemplated.

A search operation 806 executes a search of the metadata associated with the content categories stored in the content database. In one implementation, the search engine operates on the generated index of the content category metadata, although in an alternative implementation, no index exists and the search is performed on the metadata itself. The indexing or search may also operate on metadata associated with other content categories in the category branch and/or other content resources in the category branch. If the search engine determines that metadata for a given content category satisfies the search criteria associated with a descriptor, the search operation 806 returns the content category identifier.

A receiving operation 808 receives the search results from the search operation 806. A processing operation 810 collects the search results and orders the content categories according to a ranking algorithm. The processing operation 810 uses the ranking engine to rank the content categories in order of relevance, and in one implementation, returns the top (i.e., most relevant) content categories (e.g., the top three content categories).

A presentation operation 812 presents the resulting content categories to the user for consideration. If the user finds a presented content category to be acceptable, a user input operation 814 receives a selection of the category via a user interface and a submission operation 816 inputs via a database engine the proposed content category under the selected category in the taxonomy of the content database and stores the content resource under the proposed content category in the content database. The submission operation 816 also initializes the metadata associated with the newly submitted content resource via the database engine, including assigning the ASSETID, CATEGORY, and ALTERNATECATEGORY values in the metadata file.

In one implementation, the user may be offered an opportunity to provide metadata terms to characterize the proposed content category. In an alternative implementation, the owner of the content database generates at least a portion of the metadata associated with the proposed content category in order to enhance the search accuracy. Indexing on the newly supplemented metadata in the database may be performed after each submission, on a periodic schedule, or when manually initiated.

Figure 9:
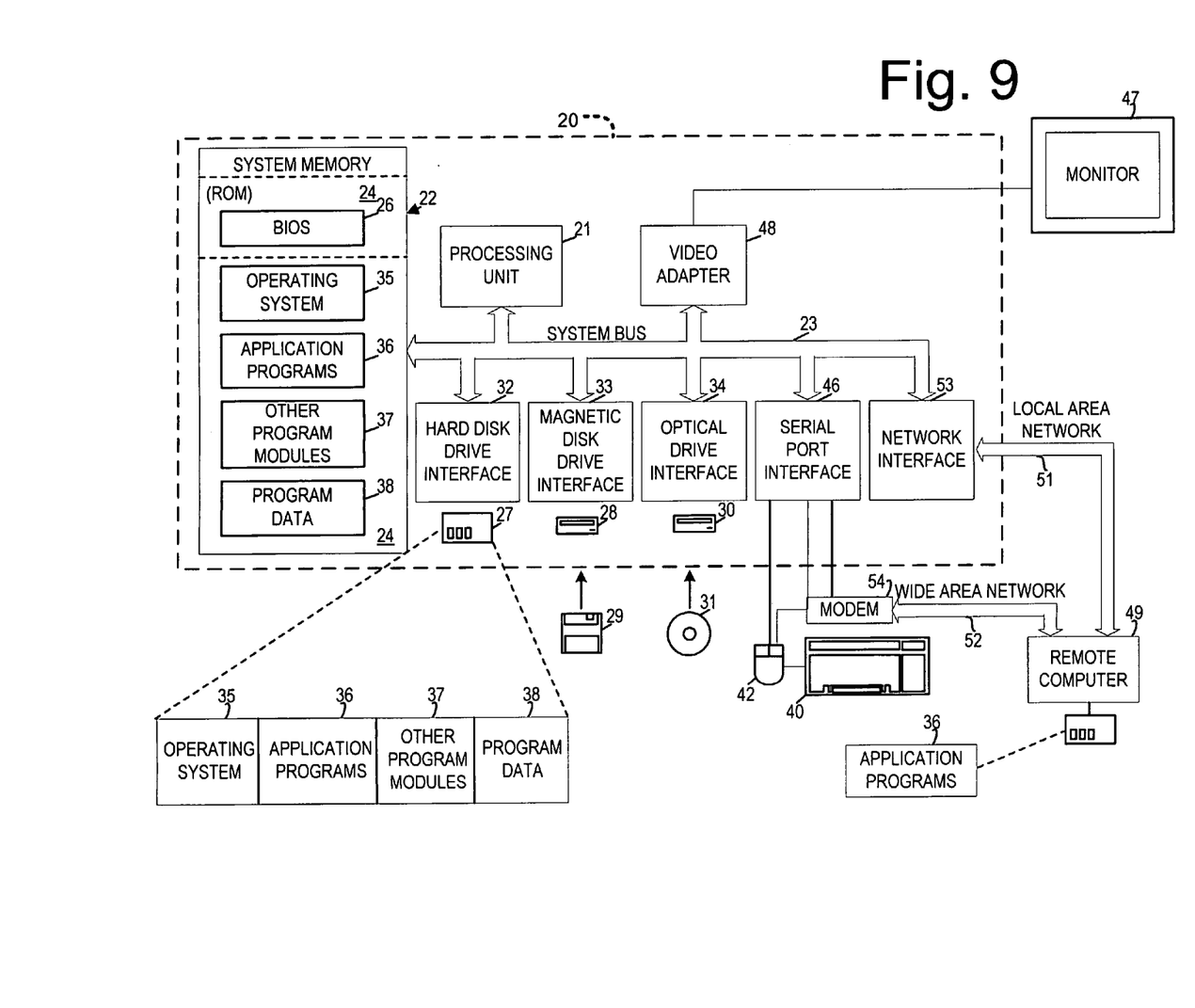
FIG. 9 illustrates a system that may be useful in implementing the described technology.

The exemplary hardware and operating environment of FIG. 9 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, an automated content categorizer and other modules may be incorporated as part of the operating system 35, application programs 36, or other program modules 37. Content category metadata, content resource metadata, search results, ranking data, and other data may be stored as program data 38.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understood that the described technology may be employed independent of a personal computer. Other embodiments are therefore contemplated.

What is claimed is:

1. A method of suggesting a relevant content category within a taxonomy of a content database in association with a submitted content resource, the method comprising:
executing a relevance search on metadata associated with content resources stored in the content database, the relevance search being based on a search descriptor attributed to the submitted content resource and returning search results that reference a plurality of content categories;
ranking each content category in the search results based on the relevance of the associated content resource metadata to the search descriptor;
presenting at least one of the ranked content categories as the relevant content category;
receiving selection of one of the ranked content categories for associated storage of the submitted content resource;
storing the submitted content resource in the content database in association with the selected one of the ranked content categories.

2. The method of claim 1 further comprising:
generating an index of the metadata associated with the content resources stored in the content database.

3. The method of claim 1 further comprising:
generating an index of the metadata associated with the content resources stored in the content database and of metadata data associated with the one or more content categories of the taxonomy of the content database.

4. The method of claim 1 wherein the search results further reference a content resource associated with each one or more content categories and the ranking operation comprises:
ranking the content categories based on a relevance designation returned by the relevance search.

5. The method of claim 1 wherein the search results further reference a content resource associated with each one or more content categories and the ranking operation comprises:
ranking the content categories based on a relevance designation return by the relevance search and on a weighting that favors satisfaction of search criteria by multiple content resources within a single content category.

6. The method of claim 1 further comprising:
generating metadata stored in association with the submitted content resource in the content database based on user input.

7. A computer-readable storage medium having computer-executable instructions for performing a computer process implementing the method of claim 1.

8. A method of inserting a proposed category into a taxonomy of a content database, the method comprising:
executing a relevance search on metadata associated with content categories within the taxonomy of the content database, the relevance search being based on a search descriptor attributed to a proposed content category and returning search results that reference a plurality of content categories;
ranking each content category in the search results based on the relevance of the associated content category metadata to the search descriptor;
receiving selection of one of the ranked content categories;
storing the proposed content category under the selected content category within the taxonomy of the content database.

9. The method of claim 8 further comprising:
storing a submitted content resource under the proposed content category in the content database.

10. The method of claim 8 wherein the search descriptor is attributed to both the proposed content category and a submitted content resource stored under the proposed content category in the content database.

11. The method of claim 8 further comprising:
generating an index of the metadata associated with the content resources stored in the content database.

12. The method of claim 8 further comprising:
generating an index of the metadata associated with the content resources stored in the content database and of metadata data associated with the one or more content categories of the taxonomy of the content database.

13. The method of claim 8 wherein the search results further reference a content resource associated with each one or more content categories and the ranking operation comprises:
ranking the content categories based on a relevance designation returned by the relevance search.

14. The method of claim 8 wherein the search results further reference a content resource associated with each one or more content categories and the ranking operation comprises:
ranking the content categories based on a relevance designation return by the relevance search and on a weighting that favors satisfaction of search criteria by multiple content resources within a single content category.

15. The method of claim 8 further comprising:
generating metadata stored in association with a submitted content resource stored under the proposed content category in the content database, based on user input.

16. The method of claim 8 further comprising:
generating metadata stored in association with a submitted content category stored under the proposed content category in the content database, based on user input.

17. A computer-readable storage medium having computer-executable instructions for performing a computer process implementing the method of claim 8.

18. A computer-implemented system for suggesting a relevant content category within a taxonomy of a content database in association with a submitted content resource, the system comprising:
a memory;
a processing unit coupled to said memory and a program data store, the processing unit comprising:
a search engine that executes a relevance search on metadata associated with content resources stored in the content database, the relevance search being based on a search descriptor attributed to the submitted content resource and returning search results that reference a plurality of content categories and associated content resources;
a ranking engine that ranks each content category in the search results based on the relevance of the associated content resource metadata to the search descriptor; and
a user interface that receives selection of one of the ranked content categories as the relevant content category; and
a database engine that stores the submitted content resource under the selected content category in the content database.

19. The system of claim 18 wherein the user interface further receives user input from which to generate metadata stored in association with the submitted content resource in the content database.

20. The system of claim 18, wherein the user interface further receives a pathname to the submitted content resource.

* * * * *